Figure 1:
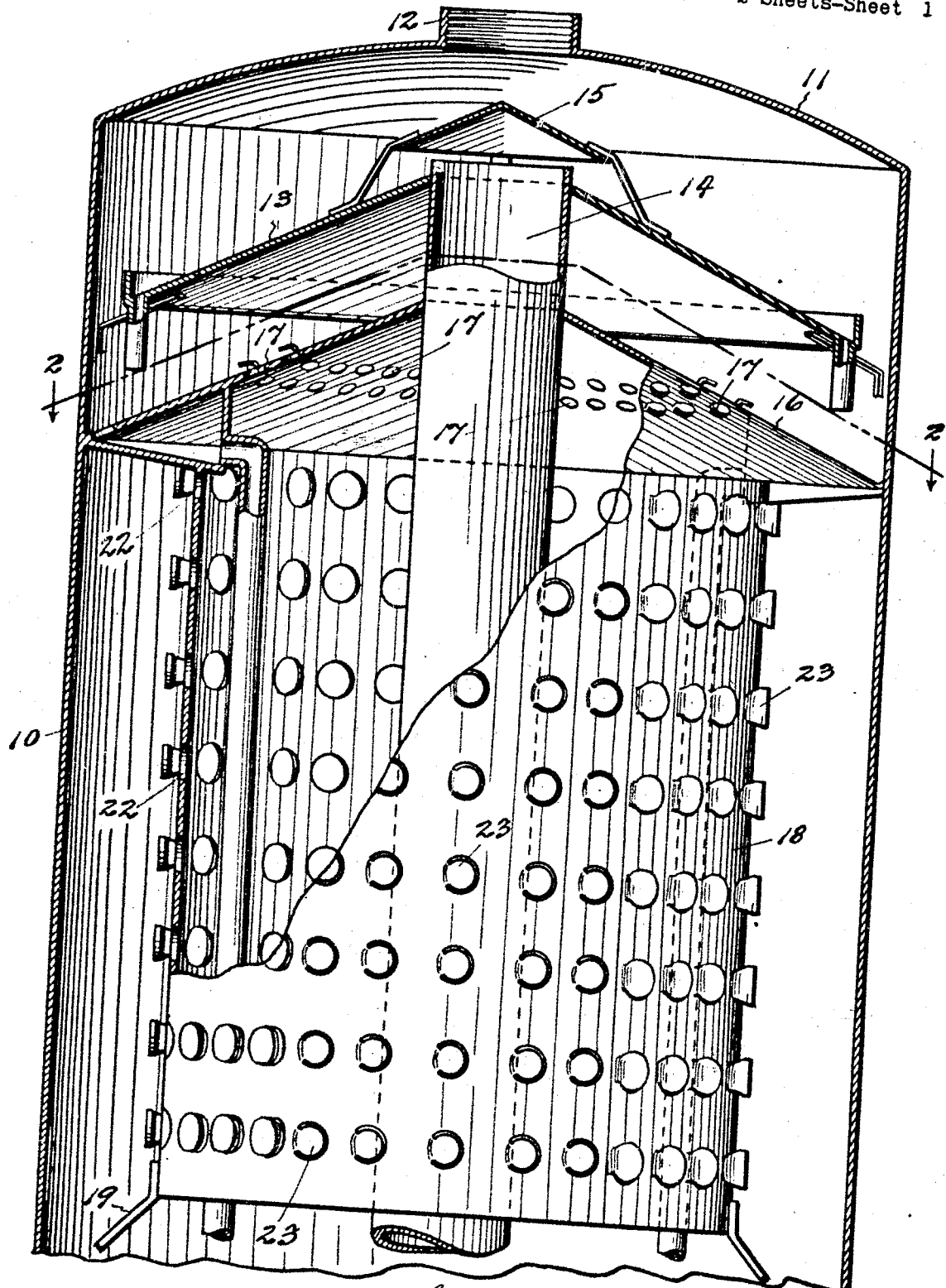

July 15, 1930.

L. M. HACKETT 1,770,774

SKIRT FOR OIL AND GAS SEPARATORS

Filed Aug. 17, 1927      2 Sheets-Sheet 1

INVENTOR
L. M. Hackett
BY
Jack A. Ashley
ATTORNEY

July 15, 1930.                    L. M. HACKETT                    1,770,774
                          SKIRT FOR OIL AND GAS SEPARATORS
                              Filed Aug. 17, 1927         2 Sheets-Sheet 2
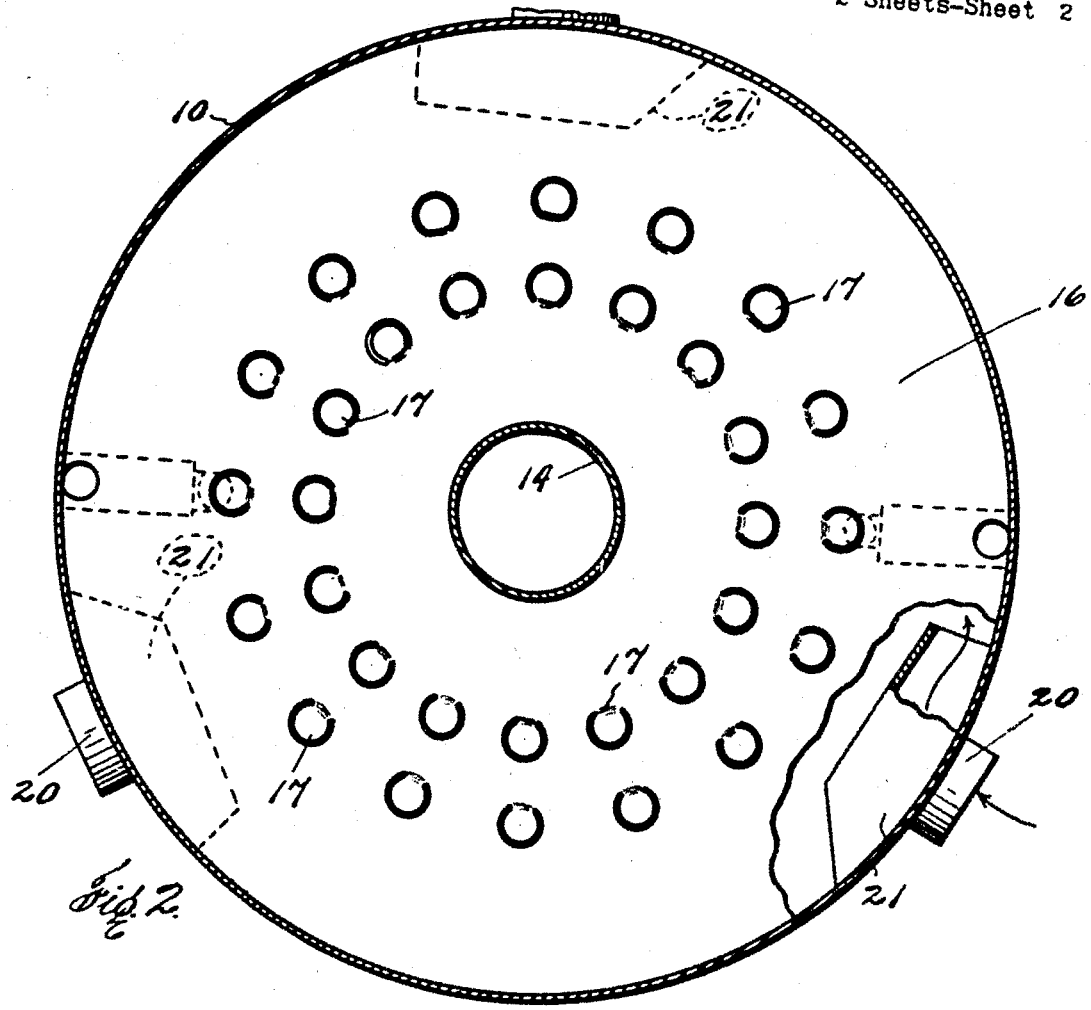
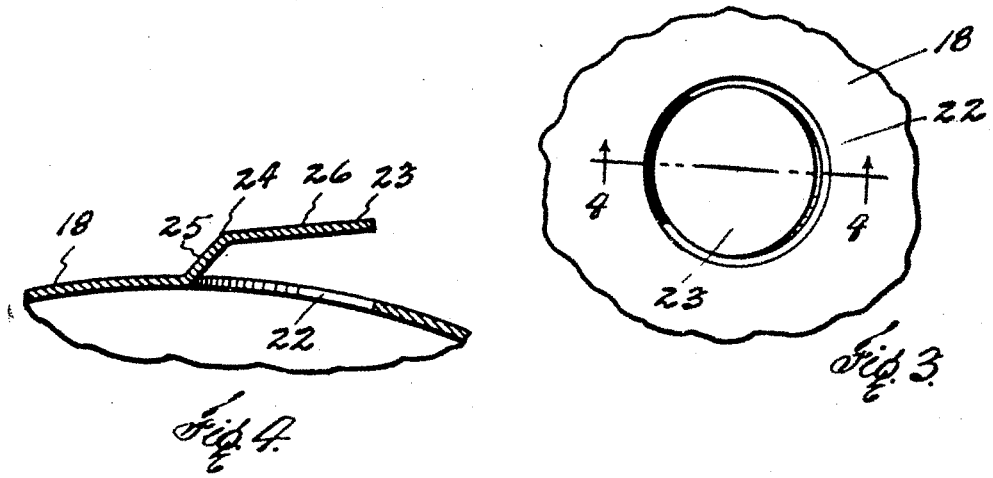
INVENTOR
L. M. Hackett.
BY Jack A Ashley
ATTORNEY Patented July 15, 1930

1,770,774

UNITED STATES PATENT OFFICE

LEWIS M. HACKETT, OF OKLAHOMA CITY, OKLAHOMA, ASSIGNOR TO AMERICAN TANK COMPANY, OF OKLAHOMA CITY, OKLAHOMA, A CORPORATION OF OKLAHOMA

SKIRT FOR OIL AND GAS SEPARATORS

Application filed August 17, 1927. Serial No. 213,493.

This invention relates to new and useful improvements in skirts for oil and gas separators.

One object of the invention is to provide a separating skirt for mounting in the tank of a separator and equipped with a plurality of spaced openings having deflectors over the openings in the path of the flowing fluid and retarding the flow without seriously impeding it, thus causing an effective separation whereby the heavier liquids are arrested and segregated.

A further object of the invention is to provide a skirt having spaced inlet openings equipped with deflectors so arranged as to cause the inflowing fluid to pass around said deflectors before entering the openings and thereby carrying out a more effective separation.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a sectional view of the upper portion of an oil and gas separator equipped with a skirt constructed in accordance with the invention, Fig. 2 is a horizontal cross-sectional view taken on the line 2—2 of Fig. 1, Fig. 3 is a detail of one of the deflectors, and Fig. 4 is a sectional view of the same.

In the drawings the numeral 10 designates a vertical separating tank having a top 11 provided with a collar 12 for the escape of gas and the like. In the upper portion of the tank is arranged a conical baffle 13 which surrounds the upper end of a central gas flue 14. A deflector 15 is supported above the top of the flue.

A second conical baffle 16 is secured within the tank below the baffle 13 and surrounding the flue. This baffle is provided with outlets 17. A cylindrical skirt 18 is suspended from the baffle 17 and suitably supported as by brackets 19. The skirt is considerably less in diameter than the tank, which has inlets 20 provided with deflector boxes 21 located in said space.

The principal feature of the skirt resides in a plurality of spaced openings 22 equipped with deflectors 23. Each deflector is preferably formed in stamping out the metal from the circular opening 22 to form the deflector 23 and bending the stamping at 24 so as to form an inclined shank 25 and a plate 26, as is best shown in Fig. 4.

The deflector boxes 21 are open at one end only and, as is shown in Fig. 2, the influent is directed in a counter-clockwise direction. The shanks 25 are presented to the influent and the plates 26 are thus given the same direction as the travel of the influent and slightly inclined from the surface of the skirt. This causes the influent to pass around the shanks and under the plates in order to enter through the openings 22. It will be obvious that such an action will retard the flow of the influent sufficiently to prevent the heavier liquids from entering through the openings 22, whereby said liquids will flow down the outer surface of the skirt. However, this retardation will not be sufficient to seriously impede the flow of the influent, which will pass on through the following separating steps.

The skirt provided with the openings and deflectors will be much more efficient than an impervious skirt and the openings at various elevations will tend to eliminate unfavorable back-pressure, as a ready means of escape is thus provided for the more volatile fluids. It will be understood that the influent after entering the openings 22 will flow up through the openings 17 of the baffle 16 and through the upper portion of the tank.

It is to be expressly understood that the invention resides in the skirt and the baffles and other portions of the separator are shown merely as an illustration, because the skirt may be used in any type of separator in which it might be found desirable, this being particularly true of the separator shown in my co-pending application Serial No. 213,492.

Various changes in the size and shape of the different parts, as well as modifications and alterations, may be made within the scope of the appended claims.

What I claim, is:

1. In an oil and gas separator, a tank, a vertical cylindrical skirt mounted in the tank and spaced therefrom, an apertured baffle closing the upper end of the skirt, inlets for the tank having means for directing an influent circumferentially of said space, and deflectors upon the outer periphery of said skirt overhanging openings therein extending in continuous series downward from the baffle to the lower end and disposed in the direction of the flow of said influent.

2. A skirt for an oil and gas separator comprising a cylindrical body open at its lower end and closed at its top by an apertured baffle and having portions upset therefrom at the outer periphery of the body to form openings and deflectors, said deflectors being connected with the edges of the openings by shanks at an angle to the body and including plates bent at an angle to the shanks and extending circumferentially of the outer periphery of the body in the direction of the flow of an influent.

In testimony whereof I affix my signature.

LEWIS M. HACKETT.